D. W. ONAN.
OILING DEVICE.
APPLICATION FILED SEPT. 21, 1916.

1,286,398.

Patented Dec. 3, 1918.

Inventor:
David W. Onan
By H. A. Whitley
his Attorney

UNITED STATES PATENT OFFICE.

DAVID W. ONAN, OF MINNEAPOLIS, MINNESOTA.

OILING DEVICE.

1,286,398.　　　　　Specification of Letters Patent.　　Patented Dec. 3, 1918.

Application filed September 21, 1916. Serial No. 121,408.

*To all whom it may concern:*

Be it known that I, DAVID W. ONAN, a citizen of the United States, residing at Minneapolis, in the county of Hennepin and State of Minnesota, have invented certain new and useful Improvements in Oiling Devices, of which the following is a specification.

My invention relates to oiling devices for vehicle springs and has for its object to provide a device for oiling the springs, comprising a member adapted to spread the leaves of the springs apart and a reservoir and pump attached to said member for injecting the lubricant between the leaves after the same are suitably spread. Another object is to form the spreading member so that the leaves are spread from one side to only a given extent and to make said spreading member adjustable to adapt the device to all sizes of springs. A still further object is to provide the spreading member with an actuating lever remotely positioned therefrom and to provide means for automatically locking said lever after the same has moved to cause the spring leaves to be spread the proper amount.

The full object and advantages of my invention will appear in connection with the detailed description thereof and are particularly pointed out in the claims.

In the drawings illustrating the application of my invention in one form,—

Figure 1 is a side view of my invention. Fig. 2 is a sectional view similar to Fig. 1 of some of the parts shown in Fig. 1 including the lubricant-injecting device. Fig. 3 is an enlarged detail view of the actuating lever shown in Fig. 1. Fig. 4 is a view similar to Fig. 3 with the parts in relatively altered positions. Fig. 5 is a sectional view taken on line 5—5 of Fig. 1. Fig. 6 is a view similar to Fig. 4 of a modification of the invention. Fig. 7 is an enlarged detail view of a modified form of spreading member.

My invention is best shown in Figs. 1 and 5, in which the spreading member is clearly illustrated. A U-shaped member 10 is provided with a head 11 which is tapped to screw upon a threaded end 12 of a long tubular spindle 13 serving as the stock or body of the device. The threaded end 12 of the tube 13 is further provided with a lock nut 14 adapted to screw up against the head 11 to firmly hold member 10 in place. A semicircular groove 15 is cut along one of the elements of the threaded portion of tube 13. Through a lug 16 formed on head 11 and through said head is drilled a hole 17 in which is positioned a ball 18 adapted to engage the groove 15. This ball is held in engagement with said threaded tube end and said groove by means of a coil spring 19 seated against a screw 20 secured in the end of hole 17. As the head 11 is rotated ball 18 rides upon the threads of portion 12 until it lodges in groove 15. This has the effect of retarding the motion of said head and so causing the same to come to rest in the correct position.

The portions of the device which come directly in contact with the vehicle spring, comprise a bit or rod 21 and an upstanding leg 22 of member 10. Bit 21 is of considerable length and is made slidable within tube 13. The end of this bit is formed with a slightly convex wedge shaped point 23 provided with a pair of shoulders 24, as shown in Fig. 1 or with a single shoulder 25, as shown in Fig. 7. Leg 22 has a narrow face 26 positioned at right angles to the rod 21. When member 10 is placed about a vehicle spring and the rod 21 advanced point 23 is forced between the leaves, causing the same to spread permitting of lubrication. It may here be remarked that due to spreading the leaves on one side of the spring only, the tool may be quickly positioned, since it is only necessary to direct the single point 23, which is located so as to be visible from the front of the spring. With the devices now in use where double points are used it becomes necessary to feel with the fingers at the rear of the spring and sometimes to count the leaves in order to correctly apply the device so that each point is not spreading different sets of leaves. Due to the reduced width of face 26 the leaves slide along the same without much friction and are spread about the same amount in the rear as in the front so that lubricant may be introduced throughout the contacting surfaces of the same. Shoulders 24 and 25 serve to limit the spreading of the leaves when the same become suitably spaced to prevent breakage of the spring clip or of the spring itself. The bit shown in Fig. 7 is of especial use in spreading the end of a spring which is usually rounded and hence recedes from the edge of the adjacent leaf.

The means for advancing bit 21 comprises a lever 27 positioned at the rear end of tube 13, as best shown in Figs. 1, 3, and 4. A band 28 terminating in two ears 29 is welded to tube 13 toward the rear end thereof, with said ears extending upward. Lever 27 is pivoted to ears 29 by means of a bolt 30 which passes through the same and said lever is provided with an angularly disposed depending portion 31 which extends through a longitudinal slot 32 in tube 13 and into a similar slot 33 formed in rod 21. The end of portion 31 is rounded off and acts against the end walls 34 and 35 of slot 33 which are formed curved, as clearly shown in Figs. 3 and 4. Portion 31 is so formed relative to lever 27 that when the same is positioned, as shown in Fig. 4, the bit 21 will have been receded to its full extent and when positioned as shown in Fig. 3 the same will have been advanced to its farthermost position. It will be noted that wall 34 is made upwardly sloping in a direction away from member 31. This has the effect of producing a back thrust on member 31 substantially in line with the axis of bolt 30 which tends to make lever 27 bind in its bearings and so become locked when situated in its closed position. It will be noted that tube 13 is made of a considerable length. This permits the same to be easily inserted between the spokes of the wheels and through other narrow openings to be applied to the springs without any difficulty.

The lubricant-injecting element of my invention is best seen in Figs. 2, 5, and 7. Rod 21 is made long enough to extend out beyond the end of tube 13 and is provided substantially throughout its entire length with a longitudinal milled slot into which has been pressed a fine tube 36 as clearly indicated in Fig. 2. At the point end of rod 21 are drilled a pair of diagonal intersecting holes 37 and 38, shown in dotted lines in Fig. 5, issuing out of the sides of said wedge-shape point 23, the hole 37 communicating with the milled slot in rod 21 previously referred to. This slot ends where it meets hole 37 and the tube therein is sweated into hole 37, thereby forming airtight communication with both of said holes. At the other end of rod 21 is screwed a reservoir 39 for the reception of a suitable lubricant which may be filled through an aperture 40 sealed by a cap 41. The end of reservoir 39 is formed open and is adapted to be closed by a head plate 42 screwable therein. In the center of plate 42 is secured a pump 43 which has a threaded neck 44 extending through said plate and secured thereto by a nut 45. In neck 44 is mounted a plunger 46 to which is attached a piston 47 operating in cylinder 43. At the end of this cylinder is secured a member 48 having an outlet 49 and an inlet 50 extending down toward the bottom of the reservoir 39 which openings are provided with suitable check valves 51 and 52. The outlet 49 is connected with the end of tube 36 which is looped at 53 to permit the parts to be assembled. When plunger 46 is operated, the lubricant is caused to be ejected through the holes 37 and 38 which action may take place after the leaves have been spread when the point 23 is between the same.

In Fig. 6 is shown a modified form of device for advancing and retracting point 23. Lever 27 is formed with a member 54 similar to member 31 to which is pivoted at 55 a link 56. Link 56 is pivoted at its opposite end to the end of rod 21 at 57 and is positioned within a slot cut in the end of said rod. When the parts are positioned, as shown in dotted lines in Fig. 6, rod 21 is retracted to its full extent and when the lever is shifted to the position shown in full lines, the same is fully advanced. It will be noted in the latter case that pivots 30, 55, and 57 are in alinement, causing the rod 21 to be locked in place when in that position. With the device as shown in this figure, the oil ejecting member cannot be advantageously employed due to the fact that lever 56 must be situated at the end of rod 57 since the slot in the same could not be made wide enough to permit both members 56 and 54 to enter into it as indicated in dotted lines.

The advantages of my invention are manifest. The same can be easily inserted between parts of the vehicle to reach the springs and is manipulated in such a manner as to give the operator the best advantage in operating the device. Due to the construction of the device the operating lever can be remotely positioned from the spreading member so that the same will extend out beyond the wheels and underguard when the device is applied to a spring. By having the oiling device attached to the spreading rod a tight connection between it and the ejecting holes is provided which prevents loss of lubricant and still permits the parts to operate freely and effectively. Due to the locking means provided at the operating lever, the springs remain spread when the device is left with said lever in its closed position.

I claim:

1. A device for operating upon vehicle springs comprising a clamping-head, a member slidable through one side of said head and having a wedge-shaped end for spreading the leaves of a spring, the other side of the head having a narrow face extending substantially at right angles to the plane of movement of said wedge-shaped end for engaging the edge of the spring, and means for sliding said slidable member.

2. A device for operating upon vehicle springs comprising a tubular stock, a clamping head screwable upon one end of said stock, a rod having a wedge-shaped member slidable within said stock in a single plane, and means for arresting said head as the same is screwed upon said stock for adjustment in fixed position relative to said stock and slidable member for each revolution of the head.

3. A device for operating upon vehicle springs comprising a tubular stock, a clamping head upon an end of said stock, a pointed rod slidable in said stock, a lever pivoted to said stock near the end remote from said head, said rod having a longitudinal slot near the point of pivot of said lever, and an arm formed on said lever passing through said tube and into the slot in said rod and engaging the end walls of said slot for sliding said rod within the tube, one of said walls being formed curved and inclined so as to cause said lever to become locked when in its closed position after the rod has been advanced its full extent.

In testimony whereof I affix my signature in presence of two witnesses.

DAVID W. ONAN.

Witnesses:
  F. A. WHITELEY,
  H. A. BOWMAN.